United States Patent [19]

Evans

[11] 4,033,475

[45] July 5, 1977

[54] ROLL-OVER GAS CAP

[75] Inventor: John H. Evans, Connersville, Ind.

[73] Assignee: Stant Manufacturing Company, Inc., Connersville, Ind.

[22] Filed: June 9, 1975

[21] Appl. No.: 584,763

[52] U.S. Cl. .................................. 220/202; 137/43; 220/303

[51] Int. Cl.² ...................................... B65D 51/16

[58] Field of Search .......... 220/203, 303, 304, 202, 220/86 NR, 373, 367; 137/43; 215/19

[56] References Cited

UNITED STATES PATENTS

| 761,364 | 5/1904 | Doriot | 215/19 |
|---|---|---|---|
| 2,113,454 | 4/1938 | Mitchell | 215/315 |
| 2,351,177 | 6/1944 | Younkman | 137/43 |
| 3,083,862 | 4/1963 | Bowden | 220/202 |
| 3,084,706 | 4/1963 | Lunde | 220/202 |
| 3,757,987 | 9/1973 | Marshall | 137/43 |
| 3,825,147 | 6/1974 | Noponen et al. | 220/303 |

Primary Examiner—William Price
Assistant Examiner—Allan N. Shoap
Attorney, Agent, or Firm—Jenkins, Hanley & Coffey

[57] ABSTRACT

In a vented cap for closing the filler neck of a liquid containing tank, the cap including a valve housing providing a venting passageway extending therethrough, the improvement comprising a roll-over valve member for closing the passageway when the filler neck is tilted. The valve housing provides a valve seat in the passageway facing inwardly and against which the valve member moves. The housing also provides a tubular portion extending inwardly from the valve seat, the valve member being moveable in that portion between a position in closing engagement with the seat and a position away from the seat. The tubular portion is provided with at least one vent port located between the positions of the valve member, the port being of a size sufficient readily to pass vapor therethrough and insufficient readily to pass liquid therethrough. When liquid enters the port from the tank, a pressure differential is created to drive the valve member into its closing position.

8 Claims, 2 Drawing Figures

ROLL-OVER GAS CAP

The present invention relates to gas caps for vehicle fuel tanks and more particularly to the provision of such a cap having a simple, yet very effective roll-over valve means for closing the venting passageway through the cap when the vehicle is tilted over or rolled over.

All sorts of roll-over valves have been proposed by the prior art for use in venting gas caps. Most of such valves have involved a weighted member which moves in a roll-over situation to close a valve port or to drive a valve member to close a valve port. The present invention constitutes an improvement over such prior art roll-over valves in that the valve closing means does not involve movement of a weighted member which might, for instance, fail because of dirt or grime causing stickiness.

The roll-over valve means of the present invention comprises plunger means disposed for reciprocation in a tubular portion between a first position closing the venting passageway and a second position opening the passageway, the tubular portion being provided with a port disposed between the positions of the plunger means. This port is of a size such that it will readily pass vapor therethrough and resist the flow of liquid therethrough. The port provides communication between the tank and the atmosphere. When the tank is tilted to the point that liquid enters the port, a pressure differential is established which will drive the plunger means to its closing position.

The roll-over means of the present invention, therefore, discriminates between vapor and liquid. A vapor, of course, has a much lower viscosity than a liquid. The low viscosity vapor will pass through the venting ports of the roll-over valve means very readily while the liquid will not. Since the liquid will not readily pass through the port, immediately a pressure differential will be established to drive the moveable valve member of the valve means to its closing position. Each such sensing port, and there may be, for instance, four such ports which are 0.04 to 0.05 inches in diameter, serves as the liquid flow restrictor which establishes a pressure differential on opposite sides of the valve closure member in the presence of liquid.

An object of the invention, therefore, is to provide, for use in venting a fuel tank, a valve housing having a venting passageway in communication with the tank, and valve means for closing the passageway when the tank is tilted to the point that the liquid enters the passageway. The valve means of the present invention includes a pressure-responsive valve member moveable in the valve housing between a position closing the venting passageway and a position opening the passageway. The housing provides first and second ports providing communicating between the passageway and the tank, the first and second ports, respectively, being on opposite sides of the valve member in its said opening position, and the first port being between the said opening and closing position of the valve member. The first port is of a size sufficient readily to pass vapor therethrough and to resist the flow of liquid therethrough while the second port is of a size sufficient readily to pass liquid therethrough. The second port, in the preferred embodiment, is normally closed by the valve member such that, when the liquid approaches the first port, and cannot pass therethrough, the pressure of the liquid on the valve member will drive it to its closing position.

Other objects and features of the present invention will become apparent as this description progresses.

In the drawings

Figure 1:
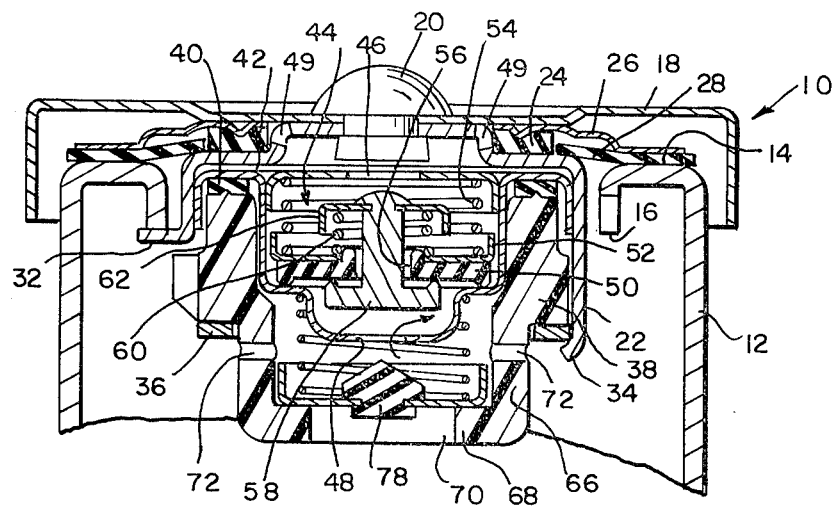
FIG. 1 is a sectional view of the gas cap of the present invention.

Referring now particularly to the drawings, it will be seen that the cap 10 is shown mounted on a filler neck 12 having a conventional axially outwardly facing lip surface 14 and a peripherally and axially inwardly extending cam-lock surface 16. The cap comprises, conventionally, an outer shell 18 which is connected by a rivet 20 to an inverted cup 22. Captured between the cup 22 and the outer shell 18 are a gasket 24, a diaphram 26 and a gasket 28 all conventionally arranged to provide a seal between the cup 22 and the lip 14 when the bayonet 32 connectors of the cup 22 are in locking engagement with the cam-lock surface 16. The cup 22 conventionally includes turned in tab portions 34 which hold a retaining ring 36 to secure a plastic valve housing 38 within the cup 22. This valve housing 38 is generally cup-shaped as illustrated, and an annular gasket 40 and flange 42 are captured between the upper, peripherally extending edge of the housing 38 and the bottom of the cup 22. The flange 42 is a mounting flange of a conventional and presently commercially available pressure-vacuum valve venting assembly 44. The assembly 44 includes a closure housing providing an opening 46 in its upper end and an opening 48 in its lower end. The fuel tank is vented through these openings, and the venting is controlled by a valve assembly to be described. The cup 22 is provided with venting passageways 49 which, in turn, are in communication with venting passageways or inverted troughs conventionally formed in the outer shell 18.

The pressure-vacuum valve assembly 44 comprises a pressure valve member 50 which is urged to its closing position shown in FIG. 1 by means of a spring plate 52 and a compression spring 54. The valve member 50 has a central opening 56 which is normally closed by a vacuum valve member 58 urged to its closing position by a spring 60 which acts between the valve member 50 and the spring plate 62. When the pressure in the tank (filler neck 12) exceeds a predetermined superatmospheric level, the valve member 50 will move upwardly or axially outwardly against the spring 54 to vent the tank. Conversely, when the pressure in the tank drops below a predetermined subatmospheric level, the valve member 58 will move downwardly or axially inwardly against the urging of the spring 60 to let air into the tank.

Figure 2:
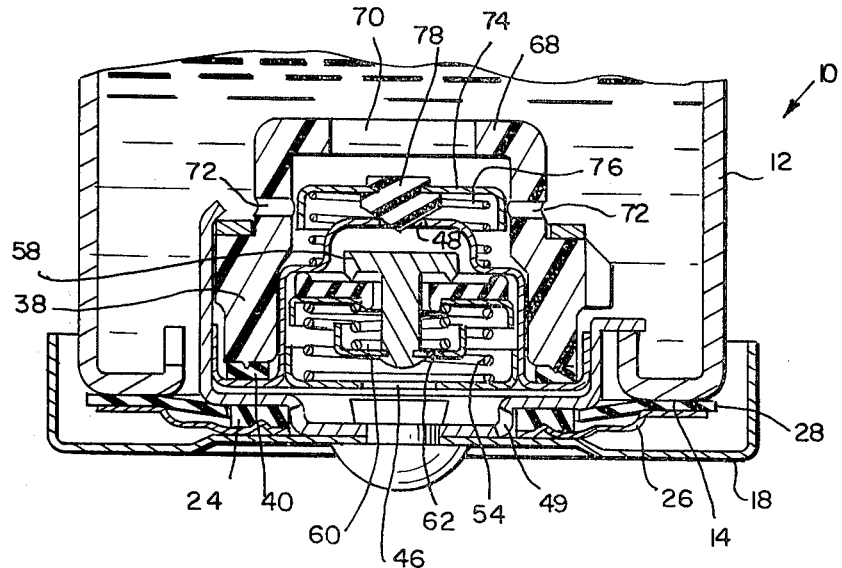
FIG. 2 is a sectional view of the cap inverted 180° to show the roll-over valve in action.

The valve housing 38 is shown including a tubular portion extending axially inwardly from the pressure-vacuum valve assembly 44 and particularly inwardly from the opening 48 in the housing for the assembly 44. The distal end 68 of this tubular portion 66 is provided with a centrally located port 70, herein sometimes referred to as the second port. The tubular portion 66 is also provided with at least one port 72 in its side wall intermediate its ends. There may be, for instance, four of such ports, and they may be of a relatively small diameter in the range of 0.04 to 0.05 inches. Within the tubular portion is a plunger means or valve member 74 yieldably urged against the distal end 68 by a spring 76, the valve member 74 illustratively carrying a rubberlike portion 78 for engaging and closing the opening 48 in the housing for assembly 44. Because of their size, the ports 72 will not readily pass liquid gasoline therethrough, but they will readily pass gasoline vapor and air therethrough. Thus, the normal venting through the valve assembly 44 occurs through the ports 72. When the tank is tilted (or the filler neck 12 is tilted to the point that liquid gasoline attempts to flow through the ports 72, and is restricted by the ports 72, the pressure in the filler neck external to the tubular portion 66 will be considerably greater than it is within the tubular portion. This pressure differential will be acting upon the valve member 74 which normally closes the port 70 to drive that valve member axially outwardly to close the port 48. FIG. 2 shows this closing action. While FIG. 2 is inverted 180° relatively to FIG. 1, it will be appreciated that the closing action will occur when the tilting is such that the pressure differential is created.

While, in the illustrative embodiment, the bottom portion of the housing for the assembly 44 about the opening 48 provides the valve seat which is engaged by the roll-over valve member to close the passageway, it will be appreciated that this structure is merely illustrative and that the housing 38 may be molded or otherwise formed to provide a valve port which is closed by the roll-over valve member when the pressure differential exists. The housing 38, and the housing of the assembly 44, therefore, comprise housing means providing a venting passageway through the cap 10.

I claim:

1. In a vented cap for closing the filler neck of a liquid containing tank, said cap including housing means provided a venting passageway extending therethrough, the improvement comprising pressure-responsive valve means for closing said passageway when said filler neck is tilted downwardly to the point where liquid contacts said cap, said housing means providing a valve seat in said passageway facing inwardly and a tubular portion extending inwardly from said valve seat, said valve means including a pressure-responsive valve member reciprocable in said tubular portion between a position in closing engagement with said seat and a position away from said seat, said venting passageway including at least one vent port located on said tubular portion between said valve member positions, said port being of a small size sufficient readily to pass vapor therethrough and insufficient readily to pass liquid therethrough to create a pressure differential in the presence of liquid sufficient to drive said valve member to said closing position.

2. The improvement of claim 1 in which said tubular portion provides a second and substantially larger port providing communication between the tank and the interior of said portion, said valve member, in its position away from said seat, normally closing said second port, and spring means yieldably urging said valve member to its position closing said second port.

3. A cap for closing a vehicle fuel tank filler neck, said cap comprising a valve housing providing a venting passageway extending therethrough, a pressure-vacuum valve assembly for venting the tank to atmosphere when the tank pressure drops below a predetermined subatmospheric level and exceeds a predetermined superatmospheric level, said housing providing a tubular portion extending inwardly from said valve assembly, in which the improvement comprises valve means for closing said passageway when said filler neck is tilted to permit liquid fuel to contact said tubular portion, said valve means including plunger means disposed for reciprocation in said tubular portion between a first position closing said passageway and a second position opening said passageway, said venting passageway including a port in said tubular portion between said positions of said plunger means, said port providing communication between said tank and the interior of said tubular portion and being of a size such that it will readily pass vapor therethrough for venting the tank but will resist the flow of liquid therethrough to create a pressure differential sufficient to move said plunger means to said first position when liquid fuel covers said port.

4. The improvement of claim 3 in which said tubular portion is provided with a second and substantially larger liquid passing port providing communication between the interior of said tubular portion and said tank, said plunger means, in its second position, normally closing said second port, and means yieldably urging said plunger means to its second position.

5. For use in venting a vehicle fuel tank, a valve housing having a venting passageway in communication with said tank, valve means for closing said passageway when said tank is tilted to the point that liquid enters said passageway, said valve means including a pressure-responsive valve member movable in said housing between a position closing said passageway and a position opening said passageway, said housing providing first and second ports providing communication between said passageway and said tank, said first and second ports, respectively, being on opposite sides of said valve member in its said opening position, said first port being between said positions of said valve member and of a small size sufficient readily to pass vapor therethrough and to resist the flow of liquid therethrough, and said second port being of a larger size sufficient readily to pass liquid therethrough so that the pressure of the liquid contacting said valve member in a roll-over situation will move said valve member to its closing position.

6. The invention of claim 5 including spring means for yieldably urging said valve member to its said opening position.

7. In a venting system for a liquid-containing tank having pressure-venting means for venting said tank to atmosphere whenever the pressure differential therebetween exceeds set limits, the improvement comprising roll-over valve means between said tank and said pressure-venting means, said roll-over valve means including means providing at least one venting passageway of sufficient size to allow freepassage of vapor therethrough and small enough to impede the flow of liquid from said tank therethrough, and an inhibiting valve disposed to be contacted by liquid from said tank, the flow of said liquid through said venting passageway being sufficiently impeded in a roll-over situation to allow pressure of said liquid against said inhibiting valve to trigger said inhibiting valve into a closed position for preventing passage of liquid from said tank.

8. The invention of claim 7 including spring means for yieldably urging said inhibiting valve away from said closed position.

* * * * *

UNITED STATES PATENT OFFICE
CERTIFICATE OF CORRECTION

Patent No. 4,033,475          Dated July 5, 1977

Inventor(s) John H. Evans

It is certified that error appears in the above-identified patent and that said Letters Patent are hereby corrected as shown below:

Column 1, line 61, "closing position" should be -- closing positions --;
    Column 3, line 7, "(or the filler neck 12 is tilted" should be -- (or the filler neck 12 is tilted) --;
    Column 3, line 33, (Claim 1, line 3) "provided" should be -- providing --;
    Column 4, line 7, (Claim 3, line 16), after "port" insert -- disposed --;
    Column 4, line 54 (Claim 7, line 8) "freepassage" should be -- free passage --.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*